United States Patent [19]
Grutzediek et al.

[11] 4,420,055
[45] Dec. 13, 1983

[54] APPARATUS FOR MEASURING WEIGHT AND FORCE

[76] Inventors: Hartmut Grutzediek, Dresdner Ring 1, 6203 Hochheim; Joachim Scheerer, AmFort Weisenau 38, 6500 Mainz 1; Erich Knothe, Hansenwinkel 4, 3406 Bovenden 1; Franz-Josef Melcher, Rosenwinkel 18, 3414 Hardegsen 3, all of Fed. Rep. of Germany

[21] Appl. No.: 297,349

[22] Filed: Aug. 28, 1981

Related U.S. Application Data

[63] Continuation-in-part of Ser. No. 905,020, May 11, 1978, abandoned.

[30] Foreign Application Priority Data

May 16, 1977 [DE] Fed. Rep. of Germany ....... 2722093

[51] Int. Cl.³ .............................................. G01G 7/00
[52] U.S. Cl. .................................................... 177/212
[58] Field of Search .......................................... 177/212

[56] References Cited

U.S. PATENT DOCUMENTS

| | | | |
|---|---|---|---|
| 3,816,156 | 6/1974 | Baumann et al. | 177/212 X |
| 4,034,819 | 7/1977 | Akers et al. | 177/212 X |
| 4,159,747 | 7/1979 | Realini | 177/212 X |
| 4,245,711 | 1/1981 | Kunz | 177/212 |
| 4,300,647 | 11/1981 | Knothe et al. | 177/212 |

*Primary Examiner*—George H. Miller, Jr.
*Attorney, Agent, or Firm*—Steinberg & Raskin

[57] ABSTRACT

Apparatus for measuring weight and force has a load reception part arranged for deflection on a fixed part of a weighing and force-measuring system and includes a compensation coil arrangement situated in a constant magnetic field. At least one position sensor ascertains load-dependent deflections of the load reception part from a predetermined position and feeds a sensor signal to an electric regulator circuit. The regulator circuit regulates the current through the compensation coil arrangement so that the load reception part is returned to its predetermined position. The regulator circuit includes means which impart, alternately, positive and negative values, determined by the loading, to the current flowing through the compensation coil arrangement.

15 Claims, 7 Drawing Figures

APPARATUS FOR MEASURING WEIGHT AND FORCE

BACKGROUND OF THE INVENTION

This application is a continuation-in-part of application Ser. No. 905,020, filed May 11, 1978, for "Apparatus for Measuring Weight and Force".

The present invention relates to apparatus for measuring weight and force. More particularly, the invention relates to apparatus for measuring weight and force, which apparatus has a load reception part arranged deflectably on a fixed part of a weighing and force-measuring system. A compensation coil arrangement is located in a constant magnetic field. At least one position sensor ascertains load-dependent deflections of the load reception part from a predetermined position and feeds a sensor signal to an electric regulator circuit. The regulator circuit regulates the current through the compensation coil arrangement so that the load reception part is brought back to its predetermined position.

Such apparatus for measuring weight and force, which will hereinafter briefly be called balances, have already been proposed many times. In most of these devices, a direct current is sent through the compensation coil arrangement, due to the electromagnetic force action of the direct current, to bring the load reception part back to its predetermined position in the case of a sensor-explored deflection. In such direct current-compensated balances it is especially disadvantageous that the direct current flowing through the compensation coil arrangement is load-dependent. Due to this load dependence of the compensating direct current in the compensation coils, hysteresis effects of the permanent magnet make themselves disadvantageously noticeable. Furthermore, the power loss in a current-measuring resistor, used generally for current measurement, is load-dependent, so that there is drifting of the indication. Furthermore, when this known arrangement, compensating with direct current, is used in a lever or beam balance, the bearing friction interferes, since the bearings are not constantly in motion. Also, relatively high load-dependent losses occur in the end stage delivering the direct current, since the active components of the end stage function in normal operation and not in switching operation.

German Published Specification No. 2,233,850 discloses a balance of the aforedescribed type having a reference part. The load part and reference part are mutually suspended and are independently vertically movable on the fixed part of the balance, and each has a compensation coil arranged in a common magnetic field. Detectors ascertain the load-dependent deflections of the load and reference parts from a zero position and regulate the currents in the compensation coils, via regulator circuits, by electromagnetic force action, via which the load and reference parts are each independently brought back to the zero position. Switching means are provided in this known device, which feed the direct current flowing through the reference coil either to the load coil or to a wattless consumer, in dependence upon the detector signal of the load part. The switch means preferably includes an electronic switch controlled by a pulse length modulator. The current through the compensation coil arrangement has either the value of the direct current flowing through the reference coil or a zero value.

In the aforedescribed known balance, it is especially disadvantageous that, just as in balances with a compensating direct current in the compensation coils, the power loss in the compensation coil arrangement is load-dependent, whereby a load-dependent heating of the magnetic system is caused which results in a drifting of the indication. Furthermore, there is a variation of the switching flanks of the current through the compensation coils even at first approximation, so that a very high constancy of the switching flanks and relatively highly expensive consequent circuitry are necessary.

An object of the invention is to provide an apparatus for measuring weight and force in which the power loss caused by the current in the compensation coil arrangement is independent of load, and in which the form of the switching flanks does not enter the measurement result at first approximation.

SUMMARY OF THE INVENTION

According to the invention, this object is attained by apparatus for measuring weight and force which contains a load-reception part deflectably arranged on a fixed part of the weighing and force-measuring system. The apparatus includes a compensation coil arrangement positioned in a constant magnetic field. At least one position sensor ascertains the load-dependent deflections of the load reception part from a predetermined position and feeds a sensor signal to an electric regulator circuit. The regulator circuit regulates the current through the compensation coil arrangement, so that the load reception part returns to its predetermined position. In the apparatus of the invention for measurement of weight and force, the regulator circuit contains circuit units which provide positive and negative values, predetermined by the loading, to the current flowing through the compensation coil arrangement.

The specific advantage of the apparatus of the invention is that there are no time intervals in which the current through the compensation coil arrangement is zero, but that in these intervals the current reverses its direction of flow in the compensation coil arrangement. Thus, due to the quadratic dependence of the power loss upon the current, there is also a power loss differing from zero in these intervals. Therefore, fluctuations in the power loss, in all time intervals, are substantially less than in the known balances. Furthermore, the balance of the invention improves the dynamic behavior, since a regulator circuit in which forces are generated in both directions is simpler to construct. Also, the form of the current course in the transition region between positive and negative values (switch flank) at first approximation does not affect the measurement result. Variations of the particular course of the transit region of the current make themselves noticeable only at a higher approximation, when, due to variation of the form of the current course, the power consumption of the magnetic system varies so greatly that the temperature of the magnet also varies relatively greatly.

In an especially preferred embodiment of the invention, the circuit units of the regulator circuit impart the same maximum amplitudes to the positive and the negative values of the current flowing through the compensation coil arrangement, after the cessation of the variation of the current involved with a change of direction of the carrier part. The time commencement of the current flux in a specific predetermined direction is preferably repeated at fixedly predetermined time intervals.

Although the chronological course of the variation of direction of the current through the compensation coil arrangement may occur according to any desired function, in an especially preferred embodiment of the invention, a width-modulated pulse signal is sent as current through the compensation coil arrangement. The magnitude of the positive current value is equal to the magnitude of the negative current value in the stationary condition.

The advantage of this especially preferred embodiment is that the power loss in the time intervals of the positive current flux is equal to the power loss during the time intervals of the negative current flux in the compensation coil arrangement. Thus, load-dependent heating of the magnet system is avoided, so that drifting of the indication is thereby eliminated. Furthermore, the power loss in the end stage for the generation of the current is reduced, since the transistors are operated and switched ON and OFF as switching transistors.

The circuit units are preferably connected in series after a series connection of position sensors, an adaptor circuit and a regulator. The circuit units include a pulse width modulator which delivers at the output a pulse width modulated output voltage, the keying ratio of which is controllable in dependence upon the output voltage of the regulator, that is, the output voltage of the position sensors, and is fed to an end stage which drives the pulse width modulated current through the compensation coil arrangement. The pulse width modulated current flowing through the compensation coils preferably has a fixed period. The duration of the period and the succession of the positive and negative current values within this pulse period are dimensioned so that the weighing and force-measuring system cannot follow the constant changes of current direction, due to its inertia, but is exposed to an integral compensation force which corresponds to the direct proportion of the pulse width modulated current flowing through the compensation coils. While the direct value of the pulse width modulated current, and thus the force acting upon the weighing and force-measuring system, are variable, due to variation of the keying ratio of such current, a constant power loss develops over the whole time period in the compensation coil arrangement, since the power loss is proportional to the square of the current flowing through the compensation coil.

In a preferred embodiment of the invention, the pulse width modulator compares a periodic sawtooth voltage with the output voltage of the regulator to provide a pulse width modulated output voltage. At the beginning of the sawtooth period in the pulse width modulator, the current through the compensation coil has a direction which is such that in force-compensating manner it counteracts a weight on the balance. This condition of the current flux persists until the sawtooth voltage has reached the same value as the load-dependent regulating voltage from the regulator of the regulator circuit, preferably provided as a PID regulator. The current flux direction in the compensation coil is then reversed until the beginning of the next sawtooth period.

In another preferred embodiment of the balance of the invention, the magnitudes of the positive value and the negative value of the current through the compensation coil are equal after the cessation of the variation of such current involved with the direction variation of the carrier part. Electrical devices are provided to regulate the magnitude of this current in dependence upon a temperature signal provided by a thermocouple, which may, for example, be mounted on the permanent magnet of the balance. The electrical devices preferably comprise another PID regulator, connected, on the one hand, to the thermocouple, and, on the other hand, to the end stage of the regulator circuit.

In still another preferred embodiment of the invention, a signal proportional to the current through the compensation coil arrangement is fed as an input signal to a mean-forming analog-digital converter for further processing. A current measuring resistor may be provided between the compensation coil arrangement and the analog-digital converter. The input signal of the current measuring resistor may be tapped through a low pass filter for the analog-digital converter or ADC. The time course of the analog-digital conversion occurring in the mean-forming analog-digital converter is preferably in a constant phase relationship with the current flowing through the compensation coil arrangement. In yet another preferred embodiment of the invention, the analog-digital converter has an integrating amplifier according to the multiple-ramp method disclosed in German Published Specification No. 2,114,141. The constant phase relationship between the ADC and the compensation coil arrangement achieves the object that precisely an integral number of periods of the sawtooth voltage of the pulse width modulator, and thus also an integral number of periods of the pulses of current flowing through the compensation coil arrangement, elapse during a measurement time of the ADC. Therefore, there is an optimum, theoretically infinitely high, suppression of the pulsation factor of the current in the measurement of the mean value of the current in the ADC. There is thus a steady indication. The prerequisite is that the frequency of the sawtooth voltage required in the pulse width modulator for the pulse width modulation is controllable by the time base of the ADC.

In another preferred embodiment of the invention, an electrical reference system is provided which comprises a reference coil arrangement concentric with the compensation coil arrangement in the air gap of the permanent magnets of the balance. The reference coil arrangement is deflectable in the direction of the deflection of the compensation coil arrangement by its own elastic suspension, and is holdable in a predetermined constant position against a reference load, via reference position sensors and a reference regulator circuit, by a direct reference current flowing through the reference coil arrangement. If a magnitude proportional to the reference direct current is fed to the ADC as a reference current or reference voltage, this, with the aid of such reference magnitude, carries out the comparative measurement of the current flowing through the compensation coil arrangement. This results in the elimination of the influence of the magnetic field of the permanent magnet on the measurement result of a weighing or force-measurement.

In still another preferred embodiment of the invention, the ADC is designed so that the current flowing through the compensation coil arrangement and the reference direct current through the reference coil arrangement may be fed directly to the ADC. In such an arrangement, the indication on weighing then delivers a direct mass comparison between the mass on the carrier part and the mass on the reference system.

In accordance with the invention, apparatus for measuring weight and force, including a weighing and force-measuring system having a fixed part, a load reception part arranged for deflection on the fixed part, a device for providing a constant magnetic field in operative proximity with the load reception and fixed parts, a compensation coil arrangement in the constant magnetic field, and at least one position sensor for ascertaining load-dependent deflections of the load reception part from a predetermined position, the position sensor producing a sensor signal for regulating the current through the compensation coil arrangement so that the load reception part is returned to its predetermined position, comprises a regulator circuit electrically connected to the position sensor and receiving the sensor signal from the position sensor. The regulator circuit includes an input electrically connected to the position sensor and an output electrically connected to the compensation coil arrangement. The regulator circuit regulates the current flowing through the compensation coil arrangement to return the load reception part to its predetermined position and to alternately impart positive and negative values, determined by the loading, to the current flowing through the compensation coil arrangement.

The regulator circuit imparts the same maximum amplitude to the positive and the negative values of the current flowing through the compensation coil arrangement, after cessation of current variation due to a change of direction of the load reception part.

The regulator circuit repeats the time commencement of the current flow in one direction through the compensation coil arrangement is fixed predetermined time intervals.

The regulator circuit further includes a pulse width modulator having an input coupled to the input of the regulator circuit, another input and an output coupled to the output of the regulator circuit, a decoder having an output electrically connected to the other input of the pulse width modulator and a plurality of inputs and an analog-digital converter electrically connected to the inputs of the decoder. The regulator circuit produces a width-modulated pulse signal and supplies the width-modulated pulse signal as current through the compensation coil arrangement.

The positive and negative values of the current flowing through the compensation coil arrangement are equal after the cessation of the current variation due to a change of direction of the load reception part. Electrical devices are provided and include a thermocouple for producing a temperature signal, for regulating the magnitude of the current flowing through the compensation coil arrangement in dependence upon a temperature signal.

A plurality of position sensors are connected in series. The regulator circuit is connected in series with the position sensors. The regulator circuit includes an adaptation circuit at the input thereof and an end stage at the output thereof. The pulse width modulator delivers at its output a pulse width modulated output voltage having a keying ratio controllable in dependence upon the output voltage of the regulator circuit. The output voltage is applied to the end stage and the end stage delivers the pulse width modulated current through the compensation coil arrangement.

The electrical devices include a PID regulator electrically connected to the thermocouple and to said regulator circuit.

The regulator circuit includes a regulator circuit unit comprising a PID regulator having an input electrically connected to the adaptation circuit and an output electrically connected to an input of the pulse width modulator.

The pulse width modulator provides a periodic sawtooth voltage, the frequency of which is controlled by the decoder, and compares the sawtooth voltage with the output voltage of the regulator circuit unit and at the moment of conformity of the two voltages switches the pulse width modulated output voltage from a first value to a second value.

A signal device electrically connected between the compensation coil arrangement and the analog-digital converter provides a signal proportional to the current flowing through the compensation coil arrangement and supplies the signal as an input signal to the analog-digital converter for further processing.

A current-measuring resistor electrically connected to the compensation coil arrangement is provided. A low pass filter electrically connected between the resistor and the analog-digital converter supplies an input signal to the analog-digital converter from the resistor.

The time course of the conversion operation of the analog-digital converter is in constant phase relationship with the current flowing through the compensation coil arrangement.

The device for providing a constant magnetic field comprises a permanent magnet formed to have an air gap. An electric reference system has a reference coil arrangement concentric with the compensation coil arrangement in the air gap of the permanent magnet. The reference coil arrangement has an elastic suspension and is deflectable in the direction of deflection of the compensation coil arrangement via the elastic suspension, reference position sensors in operative proximity with the reference coil arrangement. A reference regulator circuit maintains the reference coil arrangement in a predetermined constant position against a reference load via a reference direct current flowing through the reference coil arrangement.

The frequency of the sawtooth voltage in the pulse width modulator is controlled by the time base of the analog-digital converter.

The reference coil arrangement is electrically connected to the analog-digital converter and supplies a current having a magnitude proportional to the reference direct current to the analog-digital converter for the comparative measurement of the current flowing through the compensation coil arrangement.

An electrically conductive device directly supplies the current flowing through the compensation coil arrangement and the reference direct current flowing through the reference coil arrangement to the analog-digital converter.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
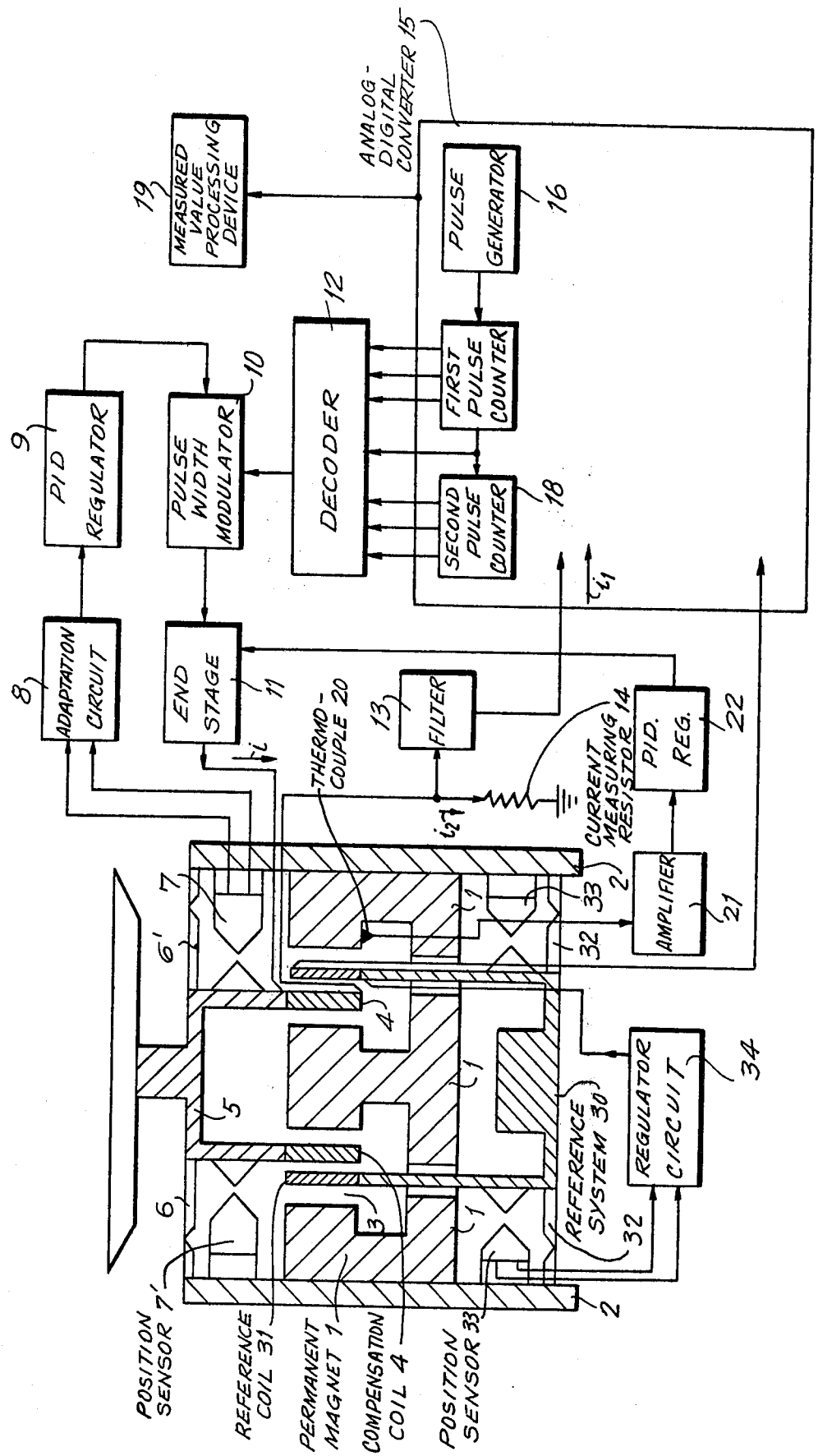
FIG. 1 is a schematic diagram and block diagram of an embodiment of the apparatus of the invention for measuring weight and force.

FIG. 1 shows an example of an embodiment of a top pan balance, the mechanical part of which is assembled in rotation symmetry in basic outlines. The essential parts of the magnetic system are represented in section. The fixed part of the balance contains a permanent magnet 1. Parts of the permanent magnet 1 may be replaced by a magnetic material. Columns 2 and 2' are fixedly connected to the permanent magnet 1. The housing in which the entire system is accommodated and secured is not illustrated for the sake of clarity.

The permanent magnet 1 has an air gap 3 accommodating a compensation coil arrangement 4 which is movable in the direction of the axis of symmetry of rotation. The compensation coil arrangement 4 is a component of a load part 5 connected to the columns 2 and 2' and guided parallel to the axis of symmetry of rotation by elastic suspensions 6 and 6'.

One or more position sensors 7 and 7' such as, for example, optical sensors or ring condensers, are secured to the fixed part of the balance. Upon deflection of the load part 5 from a predetermined position, the position sensors 7 and 7' generate a difference signal which is converted in an adaptation circuit 8 of any suitable type to a differential signal and fed to a PID regulator 9 of any suitable type in a known manner. A suitable adaptation circuit is, for example, the sensor 42 of FIG. 1 of U.S. Pat. No. 4,099,587. A suitable PID regulator is, for example, any of those disclosed in FIG. 1 of U.S. Pat. No. 3,816,156 or in the textbook Tietze-Schenk, Halbleiterschaltungstechnik, pages 237 and thereafter. The output voltage of the PID regulator 9 is continuously compared in a pulse width modulator 10 of any suitable type with a periodic sawtooth voltage having a frequency controlled by a decoder 12 of an analog-digital converter or ADC 15 of any suitable type, explained in greater detail in connection with FIG. 2. A suitable pulse width modulator is that described in the handbook, "Electronic Analog/Digital Conversions" by Herman Schmid, Van Nostrand Reinhold Company, New York, New York, page 275. A suitable analog-digital converter is that described in U.S. Pat. No. 3,765,012, which describes in detail an analog-digital converter utilizing multiple ramp integrating techniques.

The output voltage u of the pulse width modulator 10 controls the end stage 11 of any suitable type. The output of the end stage 11 delivers a current i. This current i assumes alternately a positive and a negative maximum amplitude in the rhythm of the pulse width modulated output voltage u, and first flows through the compensation coil arrangement 4, and then, in accordance with the input resistance of a filter 13 and of the integrating ADC 15, wholly or partially as $i_2$ through a current measuring resistor 14. The difference current $i-i_2$ flows through the filter 13 which is a low pass filter. The current measuring resistor 14 and the filter 13 may be eliminated. In the case of low ohmic formation, the current measuring resistor 14 transmits the entire current i to the ADC 15 and the entire current i is integrated in the ADC 15.

Figure 2:
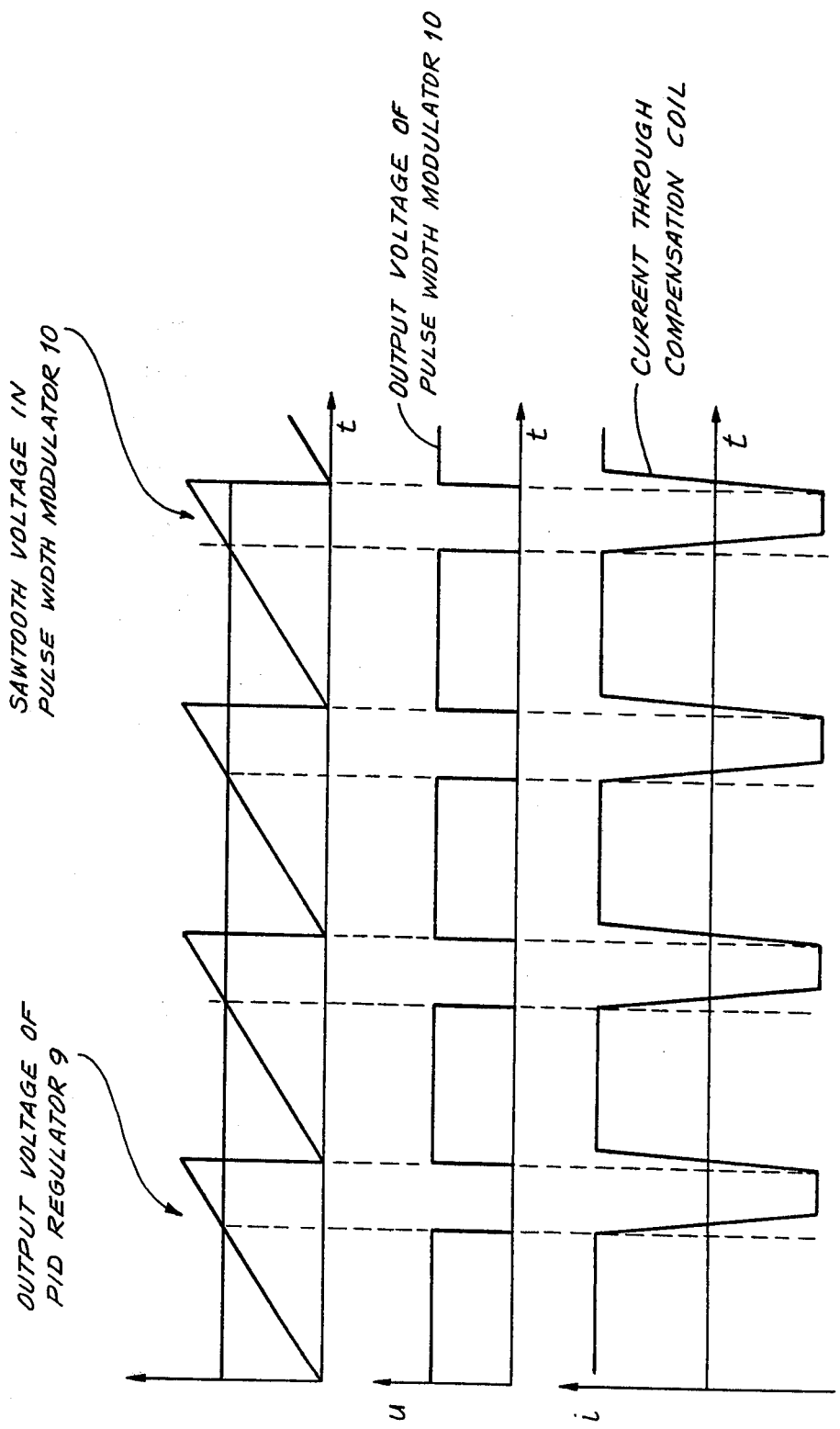
FIG. 2 is a group of graphical presentations showing the course of the output voltage of the PID regulator, the sawtooth voltage in the pulse width modulator, the output voltage of the pulse width modulator and the current through the compensation coil arrangement of the apparatus of the embodiment of FIG. 1.

A weight on the balance is compensated by the switching over of the current i at the beginning of a sawtooth period in the pulse width modulator 10 to the direction in which it counteracts the weight in force-compensating manner. The rapidity of such switching is hereinafter discussed. This current flux condition lasts until the sawtooth voltage in the pulse width modulator 10 reaches the same value as the load-dependent output voltage from the PID regulator 9. The direction of flow of the current i is then reversed until the beginning of the next sawtooth period, as shown in FIG. 2.

On appropriate variation of the direction of regulation, for example, of the PID regulator 9, the directions of the flow of the current i may also be fed in the converse sequence through the compensation coil arrangement 4, without departing from the scope of the invention. Likewise, the switching over of the direction of flow of the current i may be shifted in time to a specified, constant extent in relation to the aforedescribed time instants or periods.

In accordance with the presence and magnitude of the current measuring resistor 14, the input and output resistances of the filter 13 and the input resistance of the ADC 15, the mean value of the current i through the compensation coil arrangement 4 is measured by the mean value of the voltage across on the current measuring resistor 14, or as the direct input current $i_1$ of the ADC 15. In the latter case, the current measuring resistor 14, with an appropriate nature filter 13, may also function as a shunt for the input resistance of the ADC 15 when the current i oversteps the input range of said ADC.

A suitable analog-digital converter 15 is that having an integrated amplifier according to the multiple ramp method disclosed in German Published Specification No. 2,114,141, which may be realized very simply up to indication scopes of above $10^6$. The German Published Specification No. 2,114,141 is the priority application of U.S. Pat. No. 3,765,012. The use of this ADC offers the following advantages.

a. An integrating, or mean value forming, measurement method without measurement intervals. That is, the available time is optimally exploited.

b. A minimum of critical components.

c. The time base contained in the ADC, consisting of a pulse generator 16, a first pulse counter 17 and a second pulse counter 18, may be used via the decoder 12 simultaneously for the frequency control of the sawtooth voltage required in the pulse width modulator 10. Therefore, since, for example, the output of the first pulse counter 17 is used directly for frequency control of the sawtooth voltage in the pulse width modulator 10, it is possible to achieve, in a simple manner, the object that an exactly integral number of periods of such sawtooth voltage, and thus also an integral number of periods of the pulses of the current i through the compensation coil arrangement 4, elapse during a measurement time of the ADC 15. Thus, in the measurement of the mean value of the current i in the ADC 15, an optimum, theoretically infinitely high, suppression of the pulsation factor of the current i, and thus a steady indication, are achieved.

However, without departing from the scope of the invention, it is also possible to use a suitable analog-digital converter other than that hereinbefore mentioned. In such case, if not contained in the ADC, a separate pulse generator 16 and possibly also one or more separate pulse counters 17 and 18 must be used, in order to provide frequency control of the sawtooth voltage in the pulse width modulator 10. Thus, in an integrated ADC, the frequency of the pulse generator 16, the divider ratio of the pulse counter or counters 17 and 18 and the decoder 12 should logically be selected so that an integral number of periods of the pulses of the current i through the compensation coil arrangement 4 again occurs during a measurement time of the ADC 15. Similarly, if the filter 13 is appropriately designed, it is also possible to use a non-integrating ADC.

The chronological mean value of the current i through the compensation coil arrangement 4, determined by the ADC 15, is proportional to the force to be compensated. Thus, in this example, the current i is also proportional to the weight of the dead load and weighed article.

The heat liberated in the compensation coil arrangement 4, and possibly in the current measuring resistor 14, is independent from weight, provided that the time course of the change of direction of the current i through said compensation coil arrangement does not change, or changes corresponding little with the load. Thus, there is only little or no weight-dependent heating of the magnetic system, and thus also no weight-dependent variation of the calibration and no slow creeping of the zero point on removal of the weight. A variation of the time course of the change of directon of the current i through the compensation coil arrangement 4, possibly occurring after all as a function of time or of ambient temperature, does not enter the calibration and the zero point of the weighing system, or at most enters indirectly through a slight variation of heating of the magnetic system. Similarly, there is no load-dependent calibration-falsifying influence of hysteresis effects of the permanent magnet 1.

The power dissipated in the output transistors of the end stage 11 is slight, since when the compensation coil arrangement 4 and the supply voltage are correctly dimensioned the transistors may simply be switched through entirely. The PID regulator 9 may also be of very simple design, since, according to the pulse-key ratio of the output voltage u of the pulse width modulator 10, the mean magnetic forces acting upon the load part 5 may be reversed.

A temperature sensor, or thermocouple, 20 is included in the arrangement, as shown in FIG. 1. The temperature sensor 20 may be affixed to the permanent magnet 1, for example. A temperature regulating signal is derived through a series connected measuring amplifier 21 and another PID regulator 22, which is connected, for example, between the thermocouple 20 and the end stage of the regulator circuit. These components assist in simultaneously varying the magnitudes of the positive and negative values of the current i delivered by the end stage 11 through the compensation coil arrangement 4 and by the same magnitude after cessation of the variation related to a change of direction of said current. It is thus possible to build up a simple temperature regulation of the magnetic system against influences of the ambient temperature.

A measured value processing device 19 is connected to the digital output of the ADC 15 and permits storing of the measured value, storing of tare weights and dead loads, and deducting them from the measured value, actuating a digital indication and also transmitting the digital measurement result to a calculator for further processing.

In the embodiment of FIG. 1, the current i through the compensation coil arrangement 4, measured directly or indirectly with the aid of the ADC 15, is not determined according to its absolute value. Ordinarily, in such an ADC, a comparison is carried out with a reference current, which possibly, again, is obtained from a reference voltage. The reference current required by the ADC 15, or the reference voltage, may be obtained by a reference system 30. The reference system 30 includes a reference coil arrangement 31 positioned concentrically around the compensation coil arrangement 4, in the air gap 3. The reference coil arrangement 31 is not mechanically connected to the load part 5. The reference system 30, charged with the reference weight, is then conducted parallel to the axis of symmetry of rotation by its own elastic suspensions 32, and is held through its own position sensors 33 and regulator circuit 34 by a direct current flowing through the reference coil arrangement 31 in a constant predetermined position. This direct current, or a voltage drop derived from it across a resistor, then function as reference current or reference voltage for the ADC 15. This results in the elimination of the influence of the magnetic field of the permanent magnet 1 on the measurement result of a weighing or force-measurement. If the ADC 15 is dimensioned so that it may directly utilize the current i through the compensation coil arrangement 4 and the reference current through the reference system, a direct mass comparison results in the event of weighing.

The apparatus of the invention may be used in beam or lever balances and other force-converting balances and dynamometers, where the pulsating form of the current i flowing through the compensation coil arrangement 4 effects a slight vibration of the force-transmitting system and thus a reduced influence of bearing friction forces.

In all examples of the invention, it is a prerequisite that the time variation of the current flowing through the compensation coil arrangement from the positive to the negative current values occurs so rapidly that the weighing and force-measuring system, due to its inertia, cannot follow this constant alternation, so that the force exerted due to the current i upon the weighing and force-measuring system corresponds to the chronological mean value of the pulse width modulated current.

Figure 3:
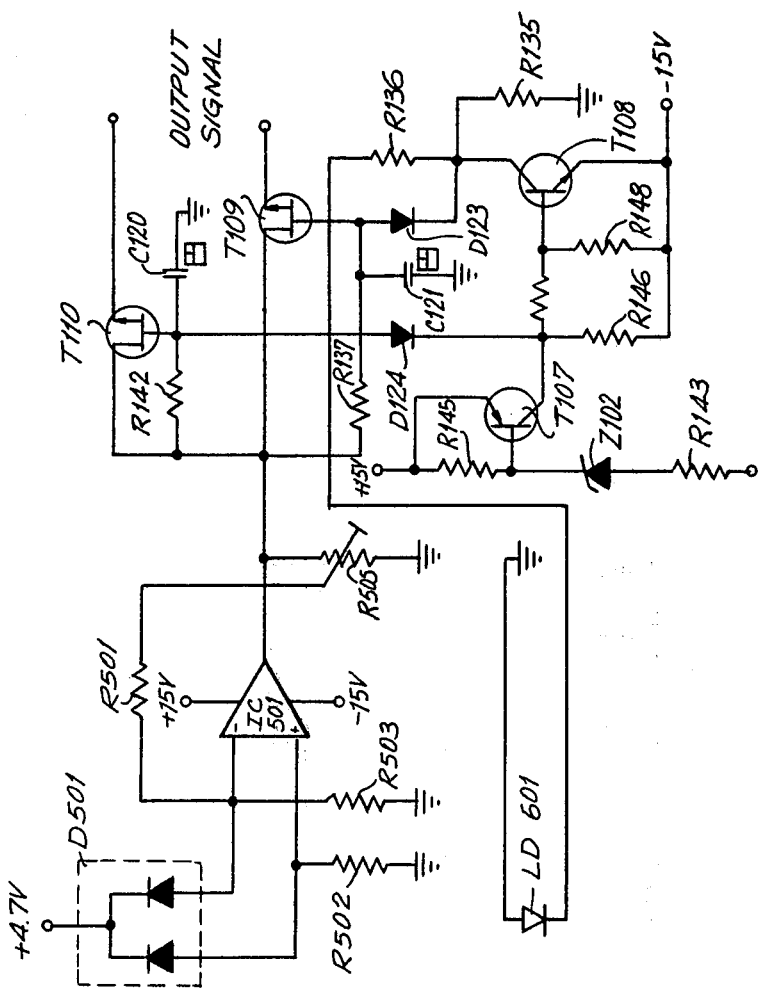
FIG. 3 is a circuit diagram of an embodiment of the position sensor and adaptation circuit of the apparatus of the embodiment of FIG. 1.
Figure 4:
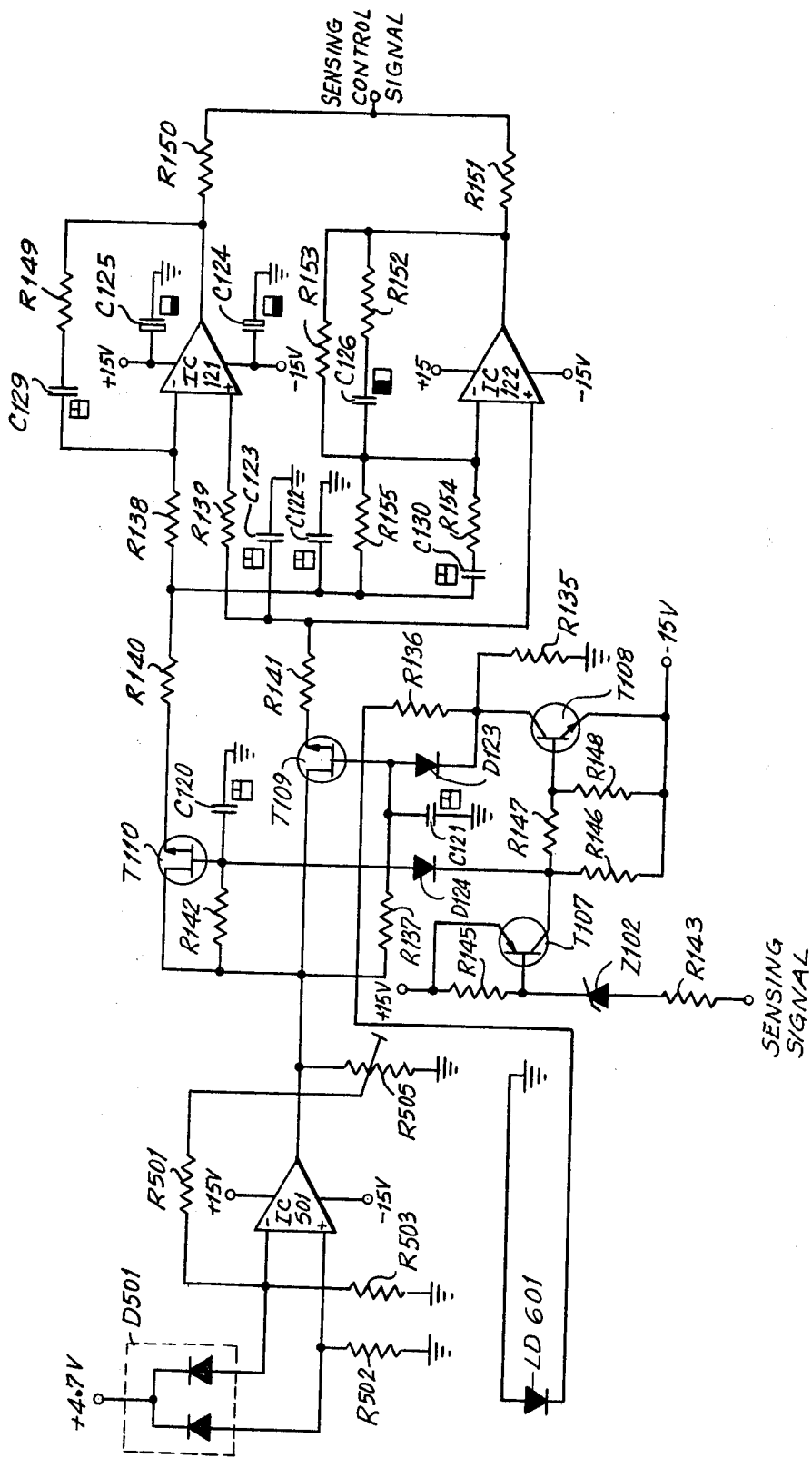
FIG. 4 is a circuit diagram of an embodiment of the position sensor, adaptation circuit and PID regulator of the apparatus of the embodiment of FIG. 1.

The position sensor 7 and adaptation circuit 8 function as an optical path voltage converter and are shown in FIGS. 3 and 4. FIG. 4 includes the PID regulator 9 and is the circuit of the position sensor 33 and the regulator circuit 34 of FIG. 1. Each of the position sensors 7 and 7' comprises an LED or light emitting diode LD601 and a double photofoil BPX48, with a difference or differential amplifier Ic501 connected in series therewith. The amplification may be varied, starting with a minimum value of 10, up to no-load amplification.

The modulator 10 is provided with a rhythm of approximately 2 kHz. With the assistance of transistors T107 and T108, it supplies the working current for the LED 601, which results in a rhythmic illuminating current with the difference amplifier Ic501 alternately transmitting bright and dark signals. The two signals are rectified by FET switches T109 and T110 and stored in capacitors C122 and C123. Since, during the bright phase, the sum of the photocurrent and the bright current flows in the double photodiode D501, while only the dark current flows during the dark phase, the difference signal, corresponding to the photocurrent, may be tapped between capacitors C122 and C123. The difference signal is not falsified by the dark current, which depends strongly on the temperature. The capacitors C120 and 121 effect a switch-on delay in the FET switches T109 and T110, in order to fade out the transfer phase between the bright and dark signals.

Figure 5:
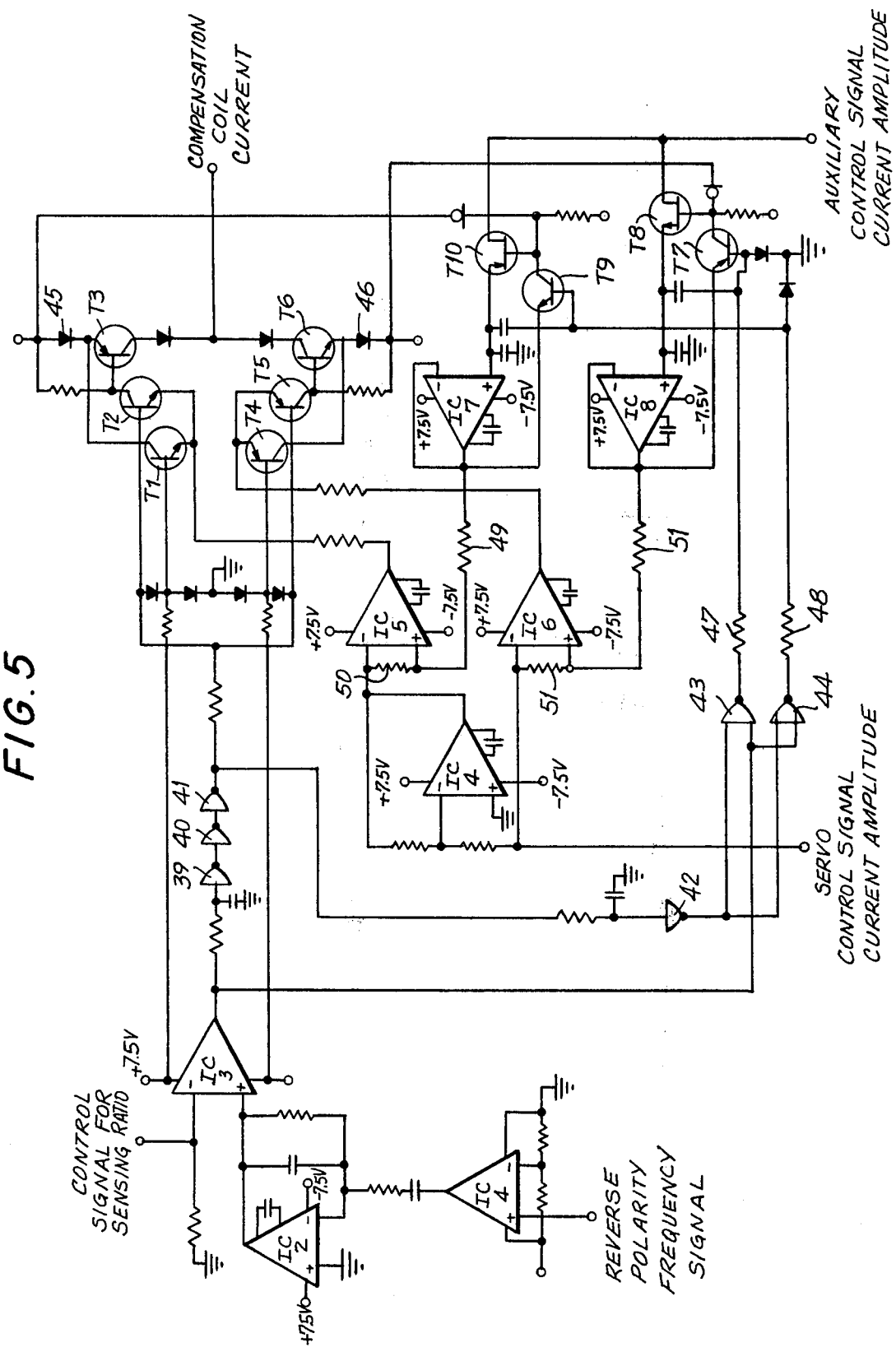
FIG. 5 is a circuit diagram of an embodiment of the pulse width modulator and end stage of the apparatus of the embodiment of FIG. 1.

The pulse width modulator 10 and end stage 11 are shown in FIG. 5. In FIG. 5, a difference or differential amplifier IC1 buffers a rectangular signal having a frequency of 20 kHz which is transmitted to the rectangular current through the coil 4. A difference amplifier IC2 converts the asymmetrical rectangular signal at its input to a symmetrical triangular signal, which is provided at its output. The amplitudes of both signals are approximately the same. A difference amplifier IC3 compares the sum of the regulating or control signals with the triangular output signal of the difference amplifier IC2 and produces, at its output, a triangular signal whose sensing ratio depends upon the sum of the control signals.

Logic components 30, 40, 41, 42, 43 and 44 produce trigger signals for switching and regulating stages. Pin 16 of these components has a voltage of +7.8 volts applied thereto and Pin 8 has a voltage of −7.8 volts applied thereto. The switching and regulating stages provide current for the compensation coil 4. The circuit for the positive compensation coil current is symmetrical or complementary to the current for the negative compensation coil current.

Transistors T1 and T2 function as a comparator. Transistors T4 and T5 function as a comparator. Transistors T3 is a rapid switching and control component with a high inverse voltage. Transistor T6 is a rapid switching and control component with a high inverse voltage. The voltage across diodes 45 and 46 assists in blocking the transistors T3 and T6. These diodes are IN4001 and the non-designated diodes are IN4148. The rapid diodes UES1105 with high inverse voltage provide the transistors T3 and T6 with blocking capacity in reverse polarity. This is important for accelerating the polarity reversal of the magnetic field when the compensation coil 4 is of high quality.

A voltage proportional to the current of the compensation coil 4 is provided at a hold capacitor via FET switches T10 and T8 and 47 kilohm resistors 47 and 48. The hold capacitor is connected to the input of a follower IC7 and a follower IC8, respectively.

The FET switches T10 and T8 are switched ON via driver transistors T9 and T7, respectively. The output voltage of these followers and hold circuits follows the compensation current signal when the transistor T3 or T6 is conductive and said output voltage holds said compensation current signal when the transistor T3 or T6 is blocked. During the "follower" phase, one regulating circuit is closed in order to maintain the compensating current constant.

Actual value-datum comparison and regulating amplifiers IC5 and IC6 utilize voltage dividers 49, 50 and 51, 52, respectively, at their inputs. The resistors 49 and 51 have a resistance of 100 kilohms and the resistors 50 and 52 have a resistance of 10 kilohms. The voltage dividers 40, 50 and 51, 52 reduce the loop amplification to 1/20 and maintain the circuit stable during several compensation coil operations. A differential amplifier IC4 produces two symmetrical datum values.

Each of the differential amplifiers IC1 to IC8 consists of a CA3130T unit and the components 39 to 44 consists of a unit MC14572CP.

Figure 6:
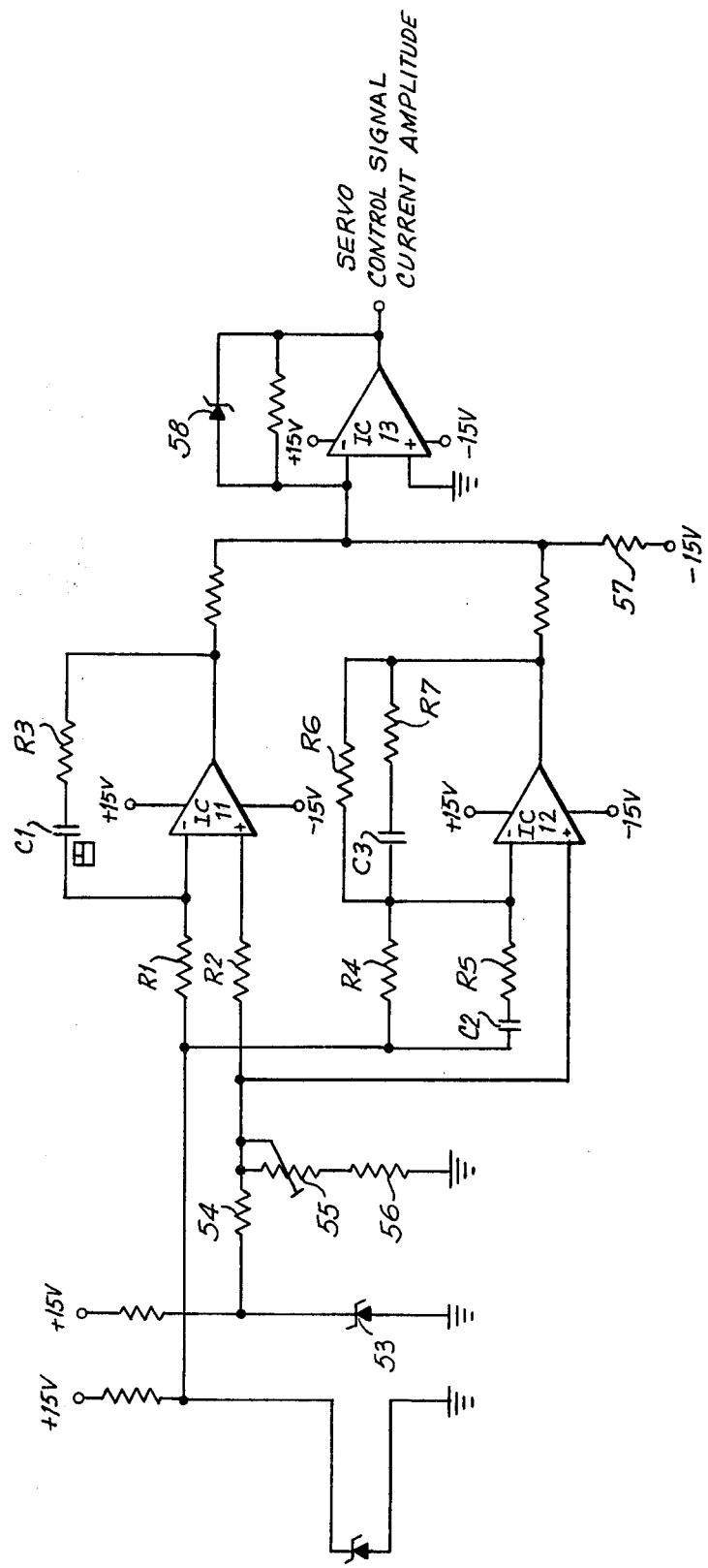
FIG. 6 is a circuit diagram of an embodiment of the thermocouple, amplifier and PID regulator of the apparatus of the embodiment of FIG. 1.

The thermocouple 20, amplifier 21 and PID regulator 22 function as a temperature voltage converter and are shown in FIG. 6. The thermocouple or temperature sensing device 20 delivers a voltage of +10 mV/K and approximately 2.9 V/K at 25° C. The voltage is compared with a reference voltage provided by a Zener diode 52, a resistor 54, a variable resistor 55 and a resistor 56. The Zener diode 53 is a IN3157 unit and the resistors 54, 55 and 56 have resistances of 4.7 kilohms, 1 kilohm and 2.4 kilohms, respectively. The difference voltage is the input voltage of a PID regulator circuit 34. The output signals of the regulator circuit 34 are added to the input of a summing amplifier IC13. In addition, a basic signal of −15 volts is applied via a resistor 57 having a resistance of 22 kilohms, in order to avoid faulty polarity of the servo control signal for the current amplitude, which is negative. A Zener diode 58, or ZPD 2.7, limits the output signal to adjust the level.

Resistors R1 to R7 and capacitors C1 to C3 are Seale type components. Each of summing amplifiers IC11 and IC12 is a TL071CP unit and the summing amplifier IC13 is a μA741CP unit.

Figure 7:
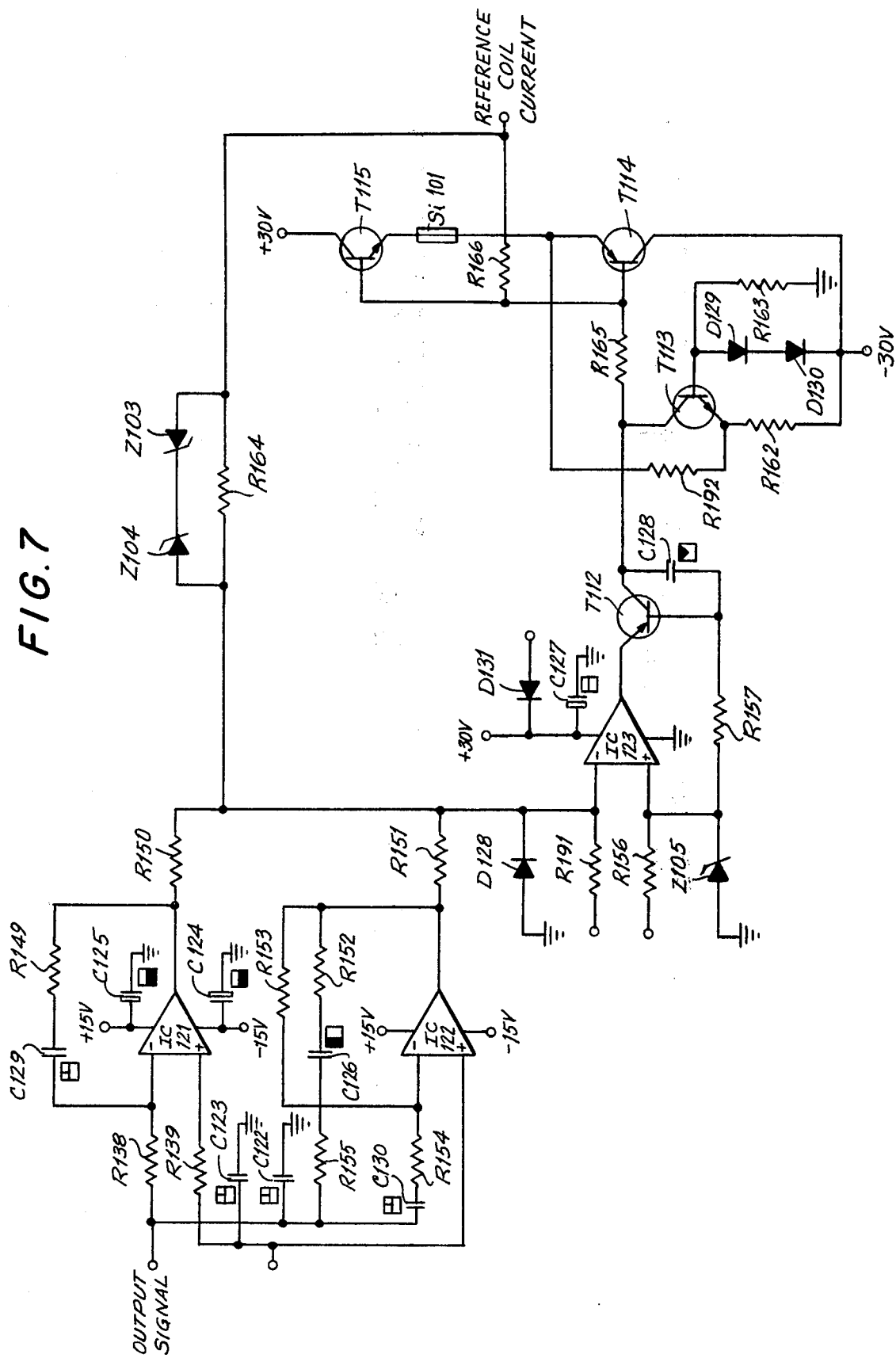
FIG. 7 is a circuit diagram of an embodiment of the PID regulator and end stage for the regulator circuit and reference coil of the apparatus of the embodiment of FIG. 1.

The PID regulator and end stage for the regulator circuit 34 of the reference coil 31 (FIG. 1) are shown in FIG. 7. The PID regulator determines the build-up behavior and the stability of the balance or scale. A difference or differential amplifier Ic121 makes the build-up position of the movable system independent of the load in some manner. This is because, in the build-up condition, the offset voltage must be applied at the difference input of the differential amplifier Ic121, the offset voltage being almost independent of the output voltage. A differential amplifier Ic122 accelerates the build-up and stabilizes the control circuit. The differential amplifiers Ic121 and Ic122 are aided by a summing amplifier Ic123. The summing amplifier Ic123 has a unilateral voltage supply in order to enable it to achieve the highest possible positive output voltage. The difference input of the summing amplifier Ic123 is therefore +2.7 V. The negative output voltage is obtained via a base follower transistor T112. Transistors T113 and T114 function as an amplifier, with the transistors T113 functioning as a constant current source and the transistor T114 functioning as the final stage.

With a no-load balance, the summing amplifier Ic123 delivers a current via the transistor T112. This current is of the same magnitude as the current of the constant current source transistor T113. The control current of the final stage transistor T114 is therefore zero, as is the output voltage. During load application, the summing amplifier Ic123 reduces its output current and is outbalanced by the current of the transistor T113. The transistor T114 is triggered, and a negative output current begins to flow. When over-loading occurs, the transistor T112 becomes blocked and the transistor T114 receives a maximum of base current from the constant current source transistor T113. The output voltage is limited by both Zener diodes Z103 and Z104.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Apparatus for measuring weight and force, including a weighing and force-measuring system having a fixed part, a load reception part arranged for deflection on the fixed part, a device for providing a constant magnetic field in operative proximity with the load reception and fixed parts, a compensation coil arrangement in the constant magnetic field, and at least one position sensor for ascertaining load-dependent deflections of the load reception part from a predetermined position, said position sensor producing a sensor signal for regulating the current through the compensation coil arrangement so that the load reception part is returned to its predetermined position, said apparatus comprising
a regulator circuit electrically connected to said position sensor and receiving said sensor signal from said position sensor, said regulator circuit including an input electrically connected to said position sensor and an output electrically connected to said compensation coil arrangement, said regulator circuit regulating the current flowing through said compensation coil arrangement to return said load reception part to its predetermined position and to alternately impart positive and negative values, determined by the loading, to the current flowing through said compensation coil arrangement,
wherein said regulator circuit imparts the same maximum amplitude to the positive and the negative values of the current flowing through the compensation coil arrangement, after cessation of current variation due to a change of direction of said load reception part.

2. Apparatus for measuring weight and force as claimed in claim 1, wherein said regulator circuit repeats the time commencement of the current flow in one direction through the compensation coil arrangement at fixed predetermined time intervals.

3. Apparatus for measuring weight and force as claimed in claim 1, wherein the positive and negative values of the current flowing through the compensation coil arrangement are equal after the cessation of the current variation due to a change of direction of said load reception part, and further comprising electrical devices, including a thermocouple for producing a temperature signal, for regulating the magnitude of the current flowing through the compensation coil arrangement in dependence upon a temperature signal.

4. Apparatus for measuring weight and force as claimed in claim 3, wherein said electrical devices include a PID regulator electrically connected to the thermocouple and to said regulator circuit.

5. Apparatus for measuring weight and force as claimed in claim 1, wherein said regulator circuit further includes a pulse width modulator having an input coupled to the input of said regulator circuit, another input and an output coupled to the output of said regulator circuit, a decoder having an output electrically connected to said other input of said pulse width modulator and a plurality of inputs and an analog-digital converter electrically connected to the inputs of said decoder, and said regulator circuit produces a width-modulated pulse signal and supplies said width-modulated pulse signal as current through said compensation coil arrangement.

6. Apparatus for measuring weight and force as claimed in claim 5, wherein a plurality of position sensors are connected in series and said regulator circuit is connected in series with said position sensors, said regulator circuit including an adaptation circuit at the input thereof and an end stage at the output thereof, said pulse width modulator delivering at its output a pulse width modulated output voltage having a keying ratio controllable in dependence upon the output voltage of the regulator circuit, said output voltage being applied to said end stage, and said end stage delivering the pulse width modulated current through the compensation coil arrangement.

7. Apparatus for measuring weight and force as claimed in claim 6, wherein said regulator circuit includes a regulator circuit unit comprising a PID regulator having an input electrically connected to said adaptation circuit and an output electrically connected to an input of said pulse width modulator.

8. Apparatus for measuring weight and force as claimed in claim 7, wherein said pulse width modulator provides a periodic sawtooth voltage, the frequency of which is controlled by said decoder, and compares said sawtooth voltage with the output voltage of said regulator circuit unit and at the moment of conformity of the two voltages switches said pulse width modulated output voltage from a first value to a second value.

9. Apparatus for measuring weight and force as claimed in claim 8, further comprising signal means electrically connected between said compensation coil arrangement and said analog-digital converter for providing a signal proportional to the current flowing through the compensation coil arrangement and supplying said signal as an input signal to said analog-digital converter for further processing.

10. Apparatus for measuring weight and force as claimed in claim 9, further comprising a current-measuring resistor electrically connected to said compensation coil arrangement and a low pass filter electrically connected between said resistor and said analog-digital converter for supplying an input signal to said analog-digital converter for said resistor.

11. Apparatus for measuring weight and force as claimed in claim 9, wherein the time course of the conversion operation of the analog-digital converter is in constant phase relationship with the current flowing through the compensation coil arrangement.

12. Apparatus for measuring weight and force as claimed in claim 11, wherein the frequency of the sawtooth voltage in said pulse width modulator is controlled by the time base of said analog-digital converter.

13. Apparatus for measuring weight and force as claimed in claim 9, wherein said device for providing a constant magnetic field comprises a permanent magnet formed to have an air gap, and further comprising an electric reference system having a reference coil arrangement concentric with the compensation coil arrangement in the air gap of the permanent magnet, said reference coil arrangement having an elastic suspension and being deflectable in the direction of deflection of the compensation coil arrangement via said elastic suspension, reference position sensors in operative proximity with said reference coil arrangement, and a reference regulator circuit for maintaining said reference coil arrangement in a predetermined constant position against a reference load via a reference direct current flowing through said reference coil arrangement.

14. Apparatus for measuring weight and force as claimed in claim 13, wherein said reference coil arrangement is electrically connected to said analog-digital converter and supplies a current having a magnitude proportional to the reference direct current to said analog-digital converter for the comparative measurement of the current flowing through said compensation coil arrangement.

15. Apparatus for measuring weight and force as claimed in claim 13, further comprising electrically conductive means for directly supplying the current flowing through said compensation coil arrangement and the reference direct current flowing through said reference coil arrangement to said analog-digital converter.

* * * * *